United States Patent
Blanchard et al.

(10) Patent No.: US 12,030,355 B2
(45) Date of Patent: Jul. 9, 2024

(54) SUSPENSION BEARING UNIT WITH STIFFENING INSERT

(71) Applicant: Aktiebolaget SKF, Gothenburg (SE)

(72) Inventors: Xavier Blanchard, Saint-Cyr-sur-Loire (FR); Bruno Montboeuf, Saint-Cyr-sur-Loire (FR); Guillaume Jouanno, Tours (FR); Desire Vidot, Ballan-Miré (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 17/855,909

(22) Filed: Jul. 1, 2022

(65) Prior Publication Data
US 2023/0028328 A1 Jan. 26, 2023

(30) Foreign Application Priority Data
Jul. 23, 2021 (FR) ...................................... 2108005

(51) Int. Cl.
*B60G 15/06* (2006.01)
*F16C 19/10* (2006.01)
*F16C 33/76* (2006.01)

(52) U.S. Cl.
CPC ............ *B60G 15/067* (2013.01); *F16C 19/10* (2013.01); *B60G 2204/418* (2013.01); *F16C 33/761* (2013.01); *F16C 2326/05* (2013.01)

(58) Field of Classification Search
CPC .... F16C 19/10; F16C 33/761; F16C 2326/05; B60G 15/067; B60G 15/068; B60G 2204/124; B60G 2204/418
See application file for complete search history.

(56) References Cited

U.S. PATENT DOCUMENTS

| 2003/0222386 | A1* | 12/2003 | Duerre | B60G 17/021 267/166 |
| 2011/0101584 | A1* | 5/2011 | Viault | F16C 35/042 267/221 |
| 2016/0059659 | A1* | 3/2016 | Bussit | B60G 15/068 29/898.041 |

FOREIGN PATENT DOCUMENTS

| DE | 102016204015 A | 9/2017 | |
| EP | 2990241 A1 | 3/2016 | |
| EP | 3534024 A1 * | 9/2019 | ........... B60G 15/068 |
| FR | 2949525 A1 | 3/2011 | |
| WO | 2011/012484 A1 | 2/2011 | |

* cited by examiner

*Primary Examiner* — Alan B Waits
(74) *Attorney, Agent, or Firm* — GARCIA-ZAMOR INTELLECTUAL PROPERTY LAW, LLC; Ruy Garcia-Zamor

(57) ABSTRACT

The unit includes a lower support cap, an upper bearing cap, and at least one bearing disposed between the caps. The unit further includes at least one stiffening insert provided with a plurality of axial through-holes, through which connecting sections of a plastics cap are accommodated.

10 Claims, 4 Drawing Sheets

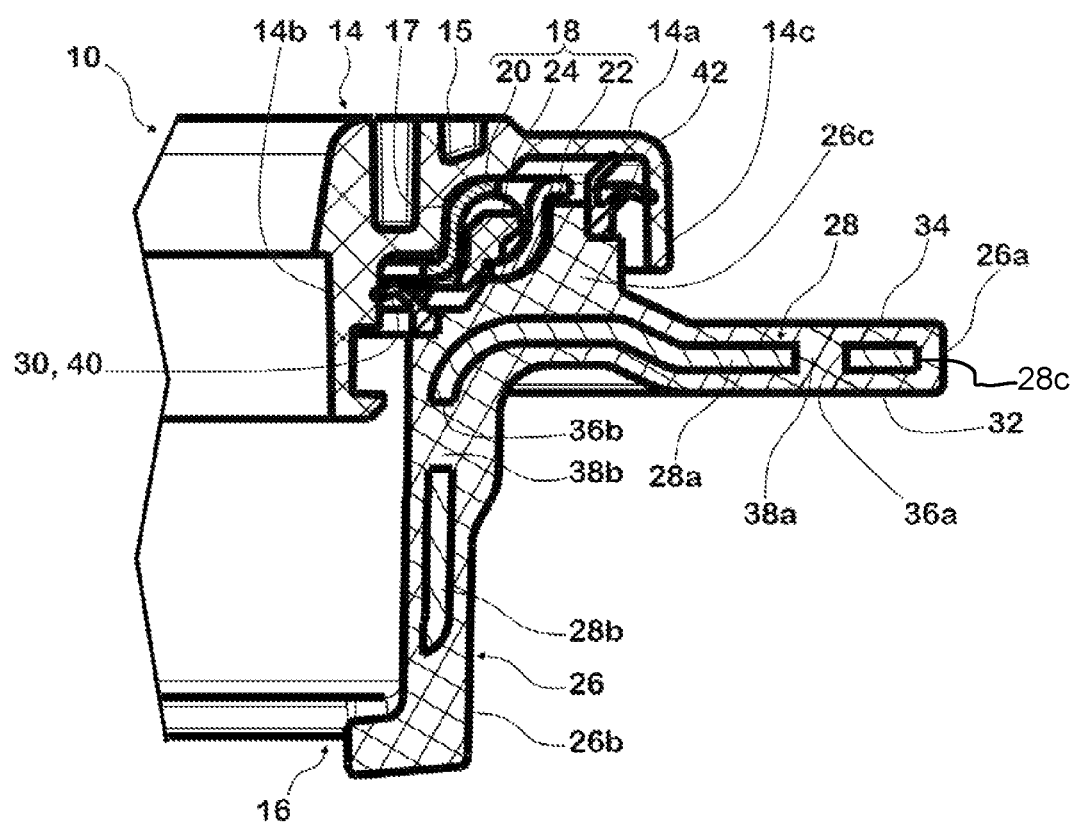
[Fig 1]

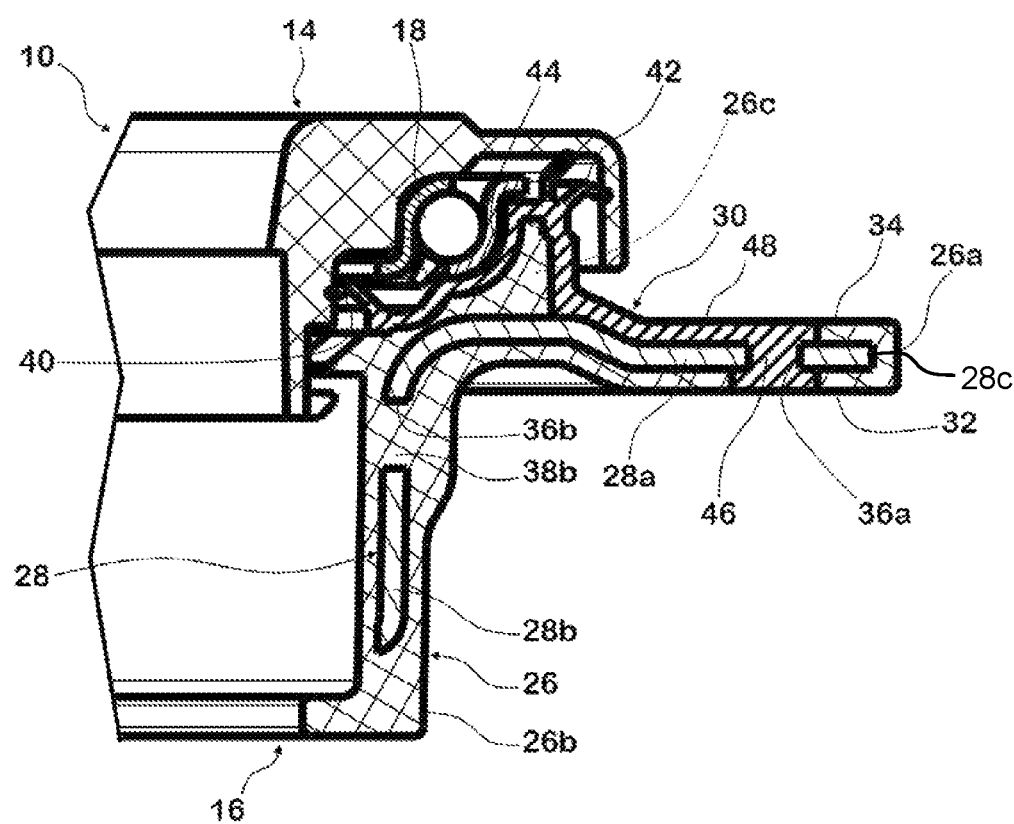
[Fig 2]

[Fig 3]
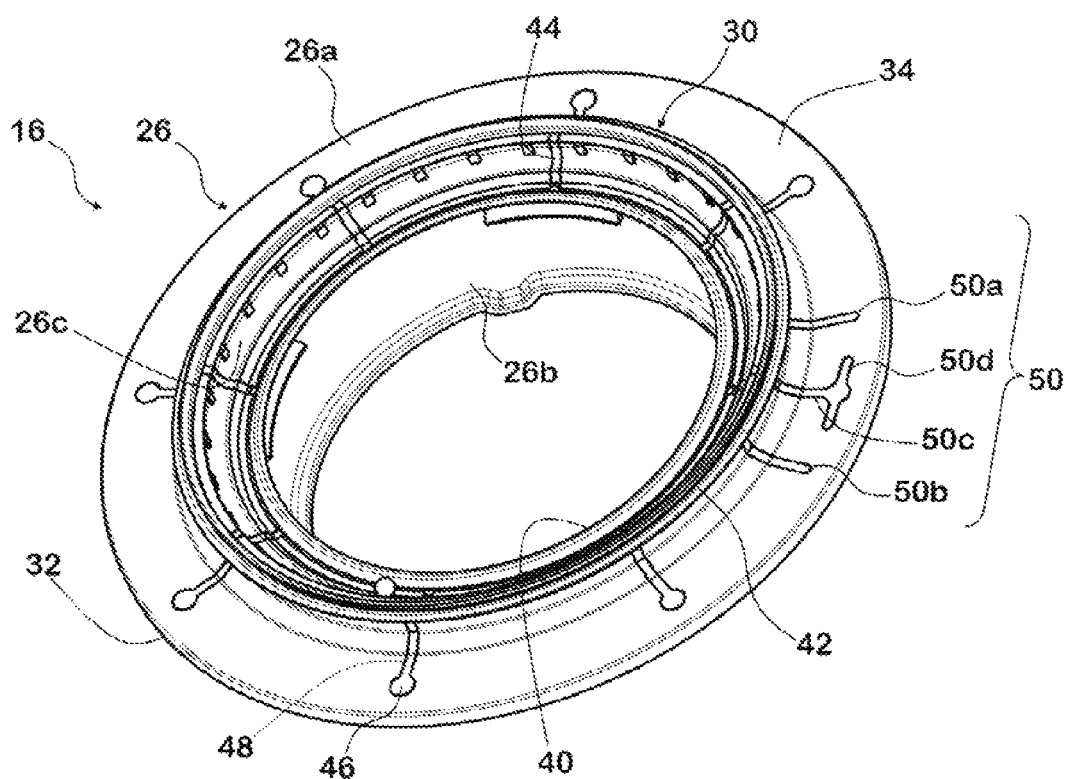

[Fig 4]
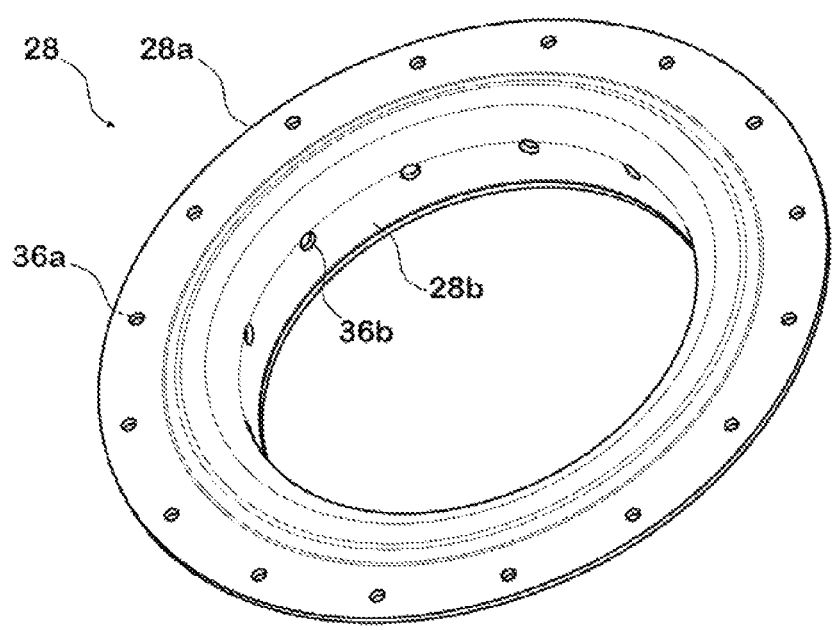

SUSPENSION BEARING UNIT WITH STIFFENING INSERT

CROSS-REFERENCE TO RELATED APPLICATIONS

This application claims priority to French Patent Application no. 2108005, filed Jul. 23, 2021, the contents of which is fully incorporated herein by reference.

TECHNICAL FIELD OF THE INVENTION

The present invention relates to the field of suspension bearing units used in particular for motor vehicles in the suspension struts of the steered wheels.

PRIOR ART

A suspension bearing unit generally comprises a rolling bearing forming an axial thrust bearing and upper and lower caps forming a housing for the rings of the rolling bearing and providing the interface between the rings and the neighbouring elements.

The suspension bearing unit is disposed in the upper part of the suspension strut between a suspension spring and the bodyshell of the vehicle. The suspension spring is mounted around a shock-absorber piston rod, the end of which is connected to the bodyshell of the vehicle. The suspension spring, of the helical spring type, bears axially, directly or indirectly, on the lower cap of the suspension bearing unit.

The suspension bearing unit makes it possible to transmit axial and radial loads between the suspension spring and the bodyshell of the vehicle while allowing a relative rotational movement between the lower cap and the upper cap arising from a turn of the steered wheels of the vehicle and/or from the compression of the suspension spring.

Generally, the lower cap of the suspension bearing unit is provided with a stiffening insert. In general, the insert has a substantially annular and overall "L" shape. The stiffening insert is provided with a radially extending external portion in order to withstand the axial loads exerted on the lower cap by a spring, and with an internal tubular portion extending axially from the inner edge of the radial portion, the tubular portion making it possible to withstand the radial loads.

For an effective hold between the insert, generally made of metallic material, and the lower cap, generally made of plastics material, it is known to carry out a process of overmoulding the plastics material of the lower cap around the metallic insert.

An aim of the present invention is to improve the structure of the lower cap of a suspension bearing unit in order to optimize the injection-moulding of plastics material and the overmoulding.

SUMMARY OF THE INVENTION

The invention relates to a suspension bearing unit comprising a lower support cap, an upper bearing cap, and at least one bearing disposed between the caps. The lower support cap comprises a stiffening insert made of rigid material, and a body made of plastics material that is at least partially overmoulded around the stiffening insert. The body of the lower support cap comprises an annular radial support portion, and an annular axial support skirt which prolongs a small-diameter edge of the radial portion, the radial portion having an annular lower radial surface delimiting a bearing surface for a suspension spring, and an upper support surface for the bearing. The stiffening insert comprises an annular radial insert portion extending in the annular radial support portion, and an annular axial tubular insert portion extending in the annular axial support skirt, the axial tubular insert portion prolonging a small-diameter edge of the radial insert portion.

According to the invention, the annular radial insert portion comprises a plurality of axial holes that are distributed circumferentially through the radial insert portion. The annular axial tubular insert portion comprises a plurality of radial holes that are distributed circumferentially through the tubular insert portion. The body of the lower support cap comprises a plurality of axial connecting sections that pass through at least a part of the axial holes of the radial insert portion, and a plurality of radial connecting sections that pass through at least a part of the radial holes of the axial tubular insert portion.

By virtue of the invention, the body of the support cap is formed from plastics material that is overmoulded both around and through the insert formed from rigid material. More precisely, connecting sections of the body that are made of plastics material make it possible to connect parts of the body on either side of the insert, axially through the holes of the radial insert portion, and radially through the holes of the axial tubular insert portion. The rigidity and the quality of the moulding of the support cap are thereby improved.

According to advantageous but non-obligatory aspects of the invention, such a suspension bearing unit may incorporate one or more of the following features, taken in any technically possible combination:

the axial through-holes are all positioned on the same diameter of the annular radial insert portion.

the radial through-holes are all at the same height of the annular axial tubular insert portion.

the axial through-holes of the radial insert portion are evenly distributed circumferentially.

the radial through-holes of the axial tubular insert portion are evenly distributed circumferentially.

the lower support cap comprises a seal made of polymer material that is overmoulded on an upper face of the annular radial support portion.

the seal comprises at least one annular sealing lip extending from the lower support cap in the direction of the upper bearing cap.

at least one annular inner sealing lip is positioned at a radially inner opening between the lower support cap and upper bearing cap.

at least one annular outer sealing lip is positioned at a radially outer opening between the lower support cap and upper bearing cap.

the seal comprises at least one annular inner sealing lip positioned at a radially inner opening, at least one annular outer sealing lip positioned at a radially outer opening between the lower support cap and upper bearing cap, and at least one sealing connecting portion extending radially and connecting the annular inner lip and annular outer lip, the seal being formed in one piece from the same moulded polymer material.

the at least one sealing connecting portion extends in an associated slot provided at an upper face of the annular radial support portion of the lower support cap.

the seal comprises a plurality of circumferentially distributed sealing connecting portions.

the seal comprises at least one annular outer sealing lip positioned at a radially outer opening between the lower support cap and upper bearing cap, at least one fixing stud passing through an axial through-hole of the radial insert portion, and a fixing connecting portion extending radially and connecting the annular outer lip to the fixing stud, the seal being formed in one piece from the same moulded polymer material.

the axial free end of the fixing stud comprises a rim of larger diameter than the associated axial through-hole.

the at least one fixing connecting portion extends in an associated slot provided at an upper face of the annular radial support portion of the lower support cap.

the slot is open on the radial insert portion, the fixing connecting portion being moulded directly on a part of the radial insert portion.

the seal comprises a plurality of studs and associated fixing connecting portions, distributed circumferentially.

the body of the lower support cap comprises at least one axial connecting section passing through an axial hole of the radial insert portion, and the seal comprises at least one fixing stud passing through another axial hole of the radial insert portion.

the lower support cap comprises indexing means.

the indexing means consist of three indexing portions that are provided at the seal, the indexing portions extending radially from the annular outer sealing lip and directed towards the outside of the cap, each indexing portion being in an associated slot provided at an upper face of the annular radial support portion of the lower support cap, a central indexing portion also being supplemented with a transverse portion accommodated in a slot that communicates with and is perpendicular to the slot of the central indexing portion in order to form a "T", the seal being formed in one piece from the same moulded polymer material.

the body of the lower support cap is made of polyamide plastics material (for example PA6 to PA6.6), possibly reinforced with glass fibres (for example GF30 to 60).

the insert is made of metallic material, for example steel.

the seal is made of polymer material, for example thermoplastic elastomer (TPE).

the bearing is a rolling bearing comprising a first ring supported by an upper face of the annular radial support portion, a second ring supported by a lower face of the upper bearing cap, and a plurality of rolling elements accommodated between the rings.

the upper face of the annular radial support portion comprises an annular radial projection provided with an annular concave surface of matching shape and forming a support for the first ring of the rolling bearing.

the at least one connecting portion of the seal extends in a slot provided at an upper surface of the annular radial projection, the first ring of the rolling bearing against the connecting portion of the seal.

BRIEF DESCRIPTION OF THE DRAWINGS

At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. The present invention will be better understood on studying the detailed description of embodiments, given by way of nonlimiting examples and illustrated by the appended drawings, in which:

FIG. 1 is a view along a first axial section plane of a suspension bearing unit according to the invention;

FIG. 2 is a view along a second axial section plane of a suspension bearing unit according to the invention;

FIG. 3 is a perspective view of a lower support cap of the unit in FIGS. 1 and 2; and FIG. 4 is a perspective view of a stiffening insert of the unit in FIGS. 1 and 2.

DETAILED DESCRIPTION OF THE INVENTION

Those of ordinary skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (2.3%) copper even if not separately listed herein and thus provides support for claiming a preferred embodiment having two point three percent (2.3%) copper. By way of an additional example, a recitation in the claims and/or in portions of an element moving along an arcuate path by at least twenty (20°) degrees, provides specific literal support for any angle greater than twenty (20°) degrees, such as twenty-three (23°) degrees, thirty (30°) degrees, thirty-three-point five) (33.5°) degrees, forty-five (45°) degrees, fifty-two (52°) degrees, or the like and thus provides support for claiming a preferred embodiment with the element moving along the arcuate path thirty-three-point five (33.5°) degrees. The suspension bearing unit 10 shown in FIG. 1 is suitable for installation between a cup or upper bearing seat coming into contact with a fixed chassis element of a motor vehicle and a suspension spring of the helical type. In FIG. 1, the unit 10 is shown in an assumed vertical position.

The unit 10 comprises an upper bearing cap 14, a lower support cap 16, and a rolling bearing 18 interposed axially between the caps. In the example illustrated, the caps 14, 16 are mounted in direct contact with the bearing 18 without the interposition of an intermediate element. Alternatively, the caps 14, 16 may be mounted in indirect contact with the bearing 18 with the interposition of an intermediate element.

The bearing cap 14 comprises a radial portion 14a, an annular axial internal skirt 14b, and an annular axial external skirt 14c radially surrounding the internal skirt. The radial portion 14a has an upper surface 15 intended to come opposite the upper bearing seat, and an opposite lower surface 17 in contact with the bearing 18. The upper surface 15 and lower surface 17 define the thickness of the radial portion 14a. In the example shown, the radial portion 14a has a stepped shape.

The external skirt 14c of the bearing cap partially radially surrounds the lower support cap 16. The external skirt 14c extends axially. The external skirt 14c extends axially from the radial portion 14a. In the example illustrated, the external skirt 14c prolongs a large-diameter edge of the radial portion 14a.

The internal skirt 14b of the bearing cap extends inside the bore of the lower support cap 16. The internal skirt 14b and external skirt 14c extend axially downwards from the radial portion 14a. The internal skirt 14b prolongs a small-diameter edge of the radial portion 14a. The external skirt 14c prolongs a large-diameter edge of the radial portion 14a.

The upper bearing cap 14 may consist of a single piece, for example made of plastics material, for example such as polyamide PA 6.6, which may or may not be reinforced with glass fibres.

The bearing 18 is situated entirely radially between the skirts 14b, 14c of the upper bearing cap 14. The bearing 18 comprises an upper ring 20 in contact with the upper bearing cap 14, a lower ring 22 in contact with the lower support cap 16, and a row of rolling elements 24, in this case balls, that are disposed between the raceways formed on the rings. In the example illustrated, the bearing 18 is of the angular contact type. The upper ring 20 is in contact with the lower surface 17 of the upper bearing cap. The lower ring 22 is in contact with an upper surface of the lower support cap 16.

The upper bearing cap 14 advantageously consists of a single piece, for example made of plastics material, for example such as polyamide PA 6.6, which may or may not be reinforced with glass fibres.

The support cap 16 comprises a body 26, a stiffening insert 28, and a seal 30.

The body 26 of the lower support cap 16 comprises an annular radial portion 26a in the form of a plate, and an annular axial skirt 26b which prolongs a small-diameter edge of the radial portion 26a. The skirt 26b extends axially away from the upper bearing cap 14 and the bearing 18. The skirt 26b centres a suspension spring (not illustrated). The radial portion 26a has an annular lower radial surface 32 delimiting a bearing surface for the suspension spring, and an upper surface 34 in contact with the lower ring 22 of the bearing and of complementary shape. Advantageously, the upper surface 34 comprises an annular radial projection 26c provided with an annular concave surface of matching shape and forming a support for the lower ring 22 of the rolling bearing 18.

The body 26 of the lower support cap 16 consists of a single piece made of plastics material, for example such as polyamide PA6 to 6.6, which may or may not be reinforced with GF30 to 60 glass fibres.

The stiffening insert 28 comprises an annular radial insert portion 28a extending in the annular radial support portion 26a, and an annular axial tubular insert portion 28b extending in the annular axial support skirt 26b, the axial tubular insert portion prolonging a small-diameter edge of the radial insert portion.

The stiffening insert 28 is made of metallic material, for example steel. The plastics material of the body 26 of the lower cap 16 is overmoulded around the insert 28.

According to the invention, and as illustrated in FIG. 4, the annular radial insert portion 28a comprises a plurality of axial holes 36a that are distributed circumferentially through the radial insert portion 28a. The annular axial tubular insert portion 28b comprises a plurality of radial holes 36b that are distributed circumferentially through the tubular insert portion 28b. The annular axial tubular insert portion 28b also comprises a radially outermost section 28c that, when viewed in cross-section, is entirely radially outside the upper bearing cap 14.

Particularly advantageously, the axial through-holes 36a are all positioned on the same diameter of the annular radial insert portion 28a. The radial through-holes 36b are all at the same height of the annular axial tubular insert portion 28b. According to an advantageous embodiment, the axial through-holes 36a of the radial insert portion 28a are evenly distributed circumferentially. Likewise, the radial through-holes 36b of the axial tubular insert portion 28b are evenly distributed circumferentially.

The body 26 of the lower support cap 16 comprises a plurality of axial connecting sections 38a that pass through axial holes 36a of the radial insert portion 28a. Likewise, the body 26 comprises a plurality of radial connecting sections 38b that pass through radial holes 36b of the axial tubular insert portion 28b.

The body 26 is formed in one piece from the same plastics material that is moulded around and through the stiffening insert 28, the axial and radial connecting sections 38a, 38b being formed by filling the free spaces formed by the through-holes 36a, 36b through the insert with the plastics material.

According to a particularly advantageous embodiment of the invention, and as illustrated in FIGS. 2 and 3, the support cap 16 further comprises a seal 30 to prevent the ingress of contaminants towards the bearing 18. The seal 30 closes the axial space remaining between the lower support cap 16 and the upper bearing cap 14, taking account of the interposition of the bearing 18 between these caps.

The seal 30 comprises an annular inner sealing lip 40 positioned at a radially inner opening between the lower support cap 16 and upper bearing cap 14. The seal 30 further comprises an arrangement of two annular outer sealing lips 42 that are positioned at a radially outer opening between the lower support cap 16 and upper bearing cap 14. The lips 40, 42 extend from the body 26 of the lower support cap 16 in the direction of the upper bearing cap 14. The inner lip 40 is in sliding contact with a surface of the internal skirt 14b of the upper bearing cap 14 in order to ensure dynamic sealing of the inner side of the unit 10. The outer lips 42 come into sliding contact with a portion of the lower surface 17 of the radial portion 14a, and an inner surface of the external skirt 14c of the upper bearing cap 14 in order to ensure dynamic sealing of the external side of the unit 10. Alternatively, the lower support cap 16 may comprise lips forming a seal of the labyrinth type. Alternatively, the lower support cap 16 may comprise more than one inner lip, a single outer lip or more than two outer lips.

The seal 30 further comprises a plurality of sealing connecting portions 44 that are distributed circumferentially and extend radially while connecting the annular inner lip 40 and annular outer lips 42. Each sealing connecting portion 44 extends in an associated slot provided at the upper face 34 of the annular radial support portion 26a of the lower support cap 16. Advantageously, these slots extend at an upper surface of the annular radial projection 26c, the lower ring 22 of the rolling bearing 18 bearing against the sealing connecting portion 44 of the seal 30.

According to an additional feature, the seal 30 comprises a plurality of fixing studs 46 that are distributed circumferentially and each pass through an axial through-hole 36a of the radial insert portion 28a. The axial end of each fixing stud 46 comprises a rim of larger diameter than the associated axial through-hole 36a.

According to the embodiment illustrated in FIGS. 1 to 3, a part of the axial through-holes 36a receives axial connecting sections 38a of the body 26, and another part of the axial through-holes 36a receives fixing studs 46 of the seal 30.

The seal 30 further comprises fixing connecting portions 48 that extend radially and each connect the annular outer lips 42 to a fixing stud 46. Each fixing connecting portion 48 extends in an associated slot provided at the upper face 34 of the annular radial support portion 26a of the lower support cap 16. Advantageously, each slot is open on the radial insert portion 28a, each fixing connecting portion 48 being moulded directly on a part of the radial insert portion 28a.

The seal 30 is formed in one piece from the same polymer material, for example thermoplastic elastomer, that is moulded on the cap 16. More precisely, the inner sealing lip 40 and outer sealing lips 42, the studs 46, the sealing connecting portions 44 and fixing connecting portions 48 are formed from the same polymer material and moulded at the locations and slots provided for this purpose on the upper face 34 of the upper radial portion 26a. The lower support cap 16 thus comprises three elements made of different materials and is preferably formed by two-shot injection moulding on the insert 28: the body 26 made of plastics material overmoulded around and through the stiffening insert 28 made of rigid, and preferably metallic, material, the seal 30 being overmoulded on the plastics body 26 and through the metallic insert 28.

According to an additional feature, the lower support cap 16 comprises indexing means 50.

As illustrated in FIG. 3, the indexing means 50 consist of three indexing portions 50a, 50b, 50c that are provided at the seal 30, the indexing portions 50a, 50b, 50c extending radially from the annular outer sealing lips 42 and directed towards the outside of the lower support cap 16. Each indexing portion 50a, 50b, 50c extends in an associated slot provided at the upper face 34 of the annular radial support portion 26a of the body 26 of the lower support cap 16. A central indexing portion 50c, framed circumferentially by an indexing portion 50a on one side and an indexing portion 50b on the other, is also supplemented with a transverse portion 50d accommodated in a slot that communicates with and is perpendicular to the slot of the central indexing portion 50c in order to form a "T". The seal 30 being formed in one piece from the same moulded polymer material.

In the exemplary embodiments illustrated, the unit comprises an angular contact rolling bearing provided with a row of balls. The unit may comprise other types of rolling bearings, for example a bearing of the four-point contact type and/or with at least two rows of balls. The rolling bearing may comprise other types of rolling elements, for example rollers. In another variant, the unit may comprise a sliding bearing devoid of rolling elements and provided with one or more rings.

The invention claimed is:

1. A suspension bearing unit comprising:
a lower support cap,
an upper bearing cap, and
at least one bearing disposed between the caps, the lower support cap comprising a stiffening insert made of rigid material, and a body made of plastic material that is at least partially overmoulded around the stiffening insert, the body of the lower support cap comprising an annular radial support portion, and an annular axial support skirt which prolongs a small-diameter edge of the radial portion, the radial portion having an annular lower radial surface delimiting a bearing surface for a suspension spring, and an upper support surface of the bearing; the stiffening insert comprising an annular radial insert portion extending in the annular radial support portion, and an annular axial tubular insert portion extending in the annular axial support skirt, the axial tubular insert portion prolonging a small-diameter edge of the radial insert portion, wherein
the annular radial insert portion of the stiffening insert comprises a plurality of axial holes that are distributed circumferentially through the radial insert portion, the annular radial insert portion having a radially outermost section that, when viewed in cross-section, is located entirely radially outside the upper cap, and the annular axial tubular insert portion comprises a plurality of radial holes that are distributed circumferentially through the tubular insert portion, the body of the lower support cap comprising a plurality of axial connecting sections that pass through at least a part of the axial holes of the radial insert portion, and a plurality of radial connecting sections that pass through at least a part of the radial holes of the axial tubular insert portion.

2. The suspension bearing unit according to claim 1, wherein the lower support cap comprises a seal made of polymer material that is overmoulded on an upper face of the annular radial support portion.

3. The suspension bearing unit according to claim 2, wherein the seal comprises at least one annular inner sealing lip positioned at a radially inner opening, at least one annular outer sealing lip positioned at a radially outer opening between the lower support cap and upper bearing cap, and at least one sealing connecting portion extending radially and connecting the annular inner lip and annular outer lip, the seal being formed in one piece from the same moulded polymer material.

4. The suspension bearing unit according to claim 3, wherein the at least one sealing connecting portion extends in an associated slot provided at an upper face of the annular radial support portion of the lower support cap.

5. The suspension bearing unit according to claim 2, wherein the seal comprises at least one annular outer sealing lip positioned at a radially outer opening between the lower support cap and upper bearing cap, at least one fixing stud passing through an axial through-hole of the radial insert portion, and a fixing connecting portion extending radially and connecting the annular outer lip to the fixing stud, the seal being formed in one piece from the same moulded polymer material.

6. The suspension bearing unit according to claim 5, wherein the fixing connecting portion extends in an associated slot provided at an upper face of the annular radial support portion of the lower support cap.

7. The suspension bearing unit according to claim 6, wherein the slot is open on the radial insert portion, the fixing connecting portion being moulded directly on a part of the radial insert portion.

8. The suspension bearing unit according to claim 5, wherein the axial free end of the fixing stud comprises a rim of larger diameter than the associated axial through-hole.

9. The suspension bearing unit according to claim 5, wherein the body of the lower support cap comprises at least one of the plurality of axial connecting sections passing through an axial hole of the radial insert portion, and the seal comprises the at least one fixing stud passing through another axial hole of the radial insert portion.

10. A suspension bearing unit comprising:
a lower support cap,
an upper bearing cap, and
at least one bearing disposed between the caps, the lower support cap comprising a stiffening insert made of rigid material, and a body made of plastics material that is at least partially overmoulded around the stiffening insert, the body of the lower support cap comprising an annular radial support portion, and an annular axial support skirt which prolongs a small-diameter edge of the radial portion, the radial portion having an annular lower radial surface delimiting a bearing surface for a suspension spring, and an upper support surface of the bearing; the stiffening insert comprising an annular radial insert portion extending in the annular radial support portion, and an annular axial tubular insert portion extending in the annular axial support skirt, the axial tubular insert portion prolonging a small-diameter edge of the radial insert portion, wherein the annular radial insert portion of the stiffening insert is separate and spaced only axially from the annular axial tubular portion and comprises a plurality of axial holes that are distributed circumferentially through the radial insert portion, and the annular axial tubular insert portion comprises a plurality of radial holes that are distributed circumferentially through the tubular insert portion, the body of the lower support cap comprising a plurality of axial connecting sections that pass through at least a part of the axial holes of the radial insert portion, and a plurality of radial connecting sections that pass through at least a part of the radial holes of the axial tubular insert portion, wherein the lower support cap comprises a seal made of polymer material that is overmoulded on an upper face of the annular radial support portion, wherein the lower support cap comprises indexing means which consist of three indexing portions that are provided at the seal, the indexing portions extending radially from an annular outer sealing lip and directed towards the outside of the cap, each indexing portion being in an associated slot provided at an upper face of the annular radial support portion of the lower support cap, a central indexing portion also being supplemented with a transverse portion accommodated in a slot that communicates with and is perpendicular to the slot of the central indexing portion in order to form a T-shape, the seal being formed in one piece from the same moulded polymer material.

* * * * *